United States Patent
Miyawaki

(10) Patent No.: US 12,302,804 B2
(45) Date of Patent: May 20, 2025

(54) BRANCH CUTTING SAW

(71) Applicant: U.M. KOGYO INC., Hyogo (JP)

(72) Inventor: Shozo Miyawaki, Hyogo (JP)

(73) Assignee: U.M. KOGYO INC., Hyogo (JP)

( * ) Notice: Subject to any disclaimer, the term of this patent is extended or adjusted under 35 U.S.C. 154(b) by 316 days.

(21) Appl. No.: 18/024,850

(22) PCT Filed: Feb. 4, 2021

(86) PCT No.: PCT/JP2021/004089
§ 371 (c)(1),
(2) Date: Mar. 6, 2023

(87) PCT Pub. No.: WO2022/168227
PCT Pub. Date: Aug. 11, 2022

(65) Prior Publication Data
US 2023/0320278 A1    Oct. 12, 2023

(51) Int. Cl.
*A01G 3/08*    (2006.01)
(52) U.S. Cl.
CPC .................... *A01G 3/083* (2013.01)
(58) Field of Classification Search
CPC ............. B23D 49/10; B25G 1/00; B25G 1/04
(Continued)

(56) References Cited

U.S. PATENT DOCUMENTS 2,399,393 A * 4/1946 Schillinger .............. A01G 3/08
30/294
6,345,445 B1 * 2/2002 Schofield ............... A01G 3/083
30/249

(Continued)

FOREIGN PATENT DOCUMENTS

JP  3062511 U    10/1999
JP  2000-236747 A   5/2000

OTHER PUBLICATIONS

International Search Report cited in PCT/JP2021/004089 with English Translation.

*Primary Examiner* — Phong H Nguyen
(74) *Attorney, Agent, or Firm* — BACON & THOMAS, PLLC

(57) ABSTRACT

A branch cutting saw is provided which can easily and reliably cut thin and thick branches, branches in places difficult to reach with shears, branches in dense areas, and the like. The branch cutting saw is for cutting a branch by hooking a hook section 22 onto the branch and advancing and retreating a saw blade section 11 while urging the branch toward the saw blade section 11. The hook section 22 is pivotally supported at a leading end of a sheath body 20 and is under spring bias to have a hook section steady-state position Fs in a longitudinal region Rf of the sheath body 20, and is configured to be rotationally displaced from the hook section steady-state position Fs when a load equivalent to or greater than the spring bias is applied against the spring bias. The saw blade section 11 of a saw body 10 is under spring bias to have a saw blade section steady-state position Ns at a position where a tip end of the saw blade section is retreated from the hook section 22, and is configured such that the saw blade section 11 is advanced from the saw blade section steady-state position Ns when the grip section of the saw body is manipulated against the spring bias.

16 Claims, 11 Drawing Sheets

(58) Field of Classification Search
USPC ................ 30/162, 166.3, 504, 517, 371–378
See application file for complete search history.

(56) References Cited

U.S. PATENT DOCUMENTS

| | | | |
|---|---|---|---|
| 2002/0095800 A1* | 7/2002 | Bone ................... | B23D 51/046 |
| | | | 30/372 |
| 2017/0079215 A1 | 3/2017 | Bian et al. | |
| 2021/0308856 A1* | 10/2021 | Wilson ..................... | B25G 1/04 |

* cited by examiner

BRANCH CUTTING SAW

TECHNICAL FIELD

The present invention relates to a branch cutting saw suitable for cutting tree branches.

BACKGROUND ART

Conventionally, shears and saws have been used as means for cutting and trimming tree branches. Shears are suitable for small branches, and saws are generally used for larger branches that cannot be cut with shears. In orchards, for example, unwanted branches are carefully trimmed one by one with hand shears or saws.

When using shears to cut branches, there is a difficulty in cutting when the branches are a little thicker. The shears also have a limited reach, so they cannot reach the branches that are a little higher. Cutting with the cutting edges requires the use of hand grip strength, which can tire the hand easily and is not suitable for cutting a large amount of branches. It is also unsuitable for women and other people with weak grip strength.

On the other hand, when using a saw to cut branches, the saw has a wider and higher reach than shears, and the grip strength and other fatigue are reduced. However, it is difficult to stop the swinging of the branch during cutting, so it is not suitable for cutting thin branches. In addition, in areas with dense branches, the exposed saw teeth can easily get caught on another branch, making it difficult to cut only the target branch, or the teeth may damage other branches.

CITATION LIST

Patent Literature

Patent Literature 1: Japanese Patent Application Laid-Open No. 2000-236747

SUMMARY OF INVENTION

Technical Problem

The invention of Patent Literature 1 above discloses a configuration in which a saw blade (2) is mounted through a support cylinder (8), and a spring-biased hook (16) is also mounted. The use of the hook (16) makes it possible to hook onto a desired branch (31) and cut the branch while pressing the branch against the saw blade (2).

However, in the case of the invention of Patent Literature 1, the spring bias on the hook (16) is configured to be applied in the direction in which the hook (16) retreats from the saw blade (2). Therefore, unless the branch (31) is continuously pushed toward the saw blade (2) with arm strength, the branch (31) will move backward and away from the saw blade (2), making it impossible to successfully continue the cutting operation.

Further, the saw blade (2) is kept exposed forward from the support cylinder (8) during the manipulation of hanging the hook (16) on the branch (31). This means that the exposed saw blade (2) is in the way when hooking the hook (16) on the branch (31). Especially in areas where branches are dense, the trimming operation becomes impossible or cannot be done smoothly as the saw blade (2) getting in the way makes it difficult to successfully hook the hook (16) onto the desired branch (31).

Moreover, the hook (16) is provided separately in a direction off the extension direction of the support cylinder (8). This makes the support cylinder (8) and the hook (16) more bulky near the leading end of the support cylinder (8), and when there are dense branches, it is difficult to insert the hook (16) and the support cylinder (8) in between the dense branches and hook the hook (16) on the desired branch (31).

In view of the foregoing, an object of the present invention is to solve the problems of the conventional techniques as described above and to provide a branch cutting saw with which branches can be cut securely, smoothly, with simple manipulation, and without fatigue, from thin branches that are easily shaken and difficult to secure, to relatively thick branches that are difficult to cut with shears, to branches in areas that are difficult to reach with shears, and even to branches in dense areas.

Solution to Problem

To accomplish the above object, a branch cutting saw of the present invention has a first feature that it includes a saw body including at least a saw blade section and a grip section, and a sheath body operative to hold the saw body in a freely retractable manner and including a hook section for hooking onto a branch, and is configured such that the sheath body is manipulated to hook the hook section onto a branch and, while urging the hooked branch toward the saw blade section of the saw body, the saw blade section of the saw body is advanced and retreated to cut the branch, wherein the hook section of the sheath body is pivotally supported at a leading end of the sheath body and is under spring bias to have a steady-state position in a longitudinal region of the sheath body, and is configured to be rotationally displaced from the steady-state position of the hook section when a load equivalent to or greater than the spring bias is applied against the spring bias, and the saw blade section of the saw body is under spring bias to have a steady-state position at a position where a tip end of the saw blade section is retreated from the hook section, and is configured such that the saw blade section is advanced from the steady-state position of the saw blade section when the grip section of the saw body is manipulated against the spring bias.

Further, the branch cutting saw of the present invention has, in addition to the first feature described above, a second feature that the hook section is configured such that a position of a tooth tip line of the saw blade section of the saw body is, in a branch cutting direction, at a position beyond a maximum branch acceptance line of the hook section in its steady-state position.

Further, the branch cutting saw of the present invention has, in addition to the first or second feature described above, a third feature that the hook section is configured such that a gap is created between the hook section and the tooth tip line of the saw blade section of the saw body when the hook section is rotated backward in a retreating direction from the steady-state position of the hook section.

Further, the branch cutting saw of the present invention has, in addition to any of the first through third features described above, a fourth feature that the saw blade section has, following a row of teeth, a tip end region configured as a guide edge without a teeth row, and the guide edge is configured to slope and retreat from the position of the tooth tip line toward the tip end.

Further, the branch cutting saw of the present invention has, in addition to any of the first through fourth features described above, a fifth feature that the saw includes a forward rotation stop means configured to stop a forward rotation of the hook section in a spring-biased direction beyond the steady-state position of the hook section.

Further, the branch cutting saw of the present invention has, in addition to any of the first through fifth features described above, a sixth feature that the hook section is configured in a U shape with a back portion parallel to advancing and retreating directions of the saw blade section as a bent portion and has a branch acceptance recess that opens toward a belly portion opposing the back portion, a gap formed by the U shape is configured as an advancing and retreating passage for the saw blade section, and a position of the tooth tip line of the saw blade section opposing the back portion is configured to be at a position deeper than a bottom of the branch acceptance recess.

Further, the branch cutting saw of the present invention has, in addition to any of the first through sixth features described above, a seventh feature that the saw body is configured such that the saw blade section is attached to the grip section via a rod section, and a biasing spring is arranged wound around the rod section between the sheath body and the grip section to cause the saw blade section to be spring-biased to the steady-state position of the saw blade section.

Further, the branch cutting saw of the present invention has, in addition to any of the first through seventh features described above, an eighth feature that the sheath body is configured as a cylindrical shape and has a leading end thereof covered with a back metal for pivotally supporting the hook section.

Further, the branch cutting saw of the present invention has, in addition to any of the first through eighth features described above, a ninth feature that the teeth provided in the saw blade section are isosceles triangular in shape.

Advantageous Effects of Invention

The branch cutting saw recited in claim 1 has the saw body including at least the saw blade section and the grip section, and the sheath body operative to hold the saw body in a freely retractable manner and including the hook section for hooking onto a branch. The sheath body is manipulated to hook the hook section onto a branch and, while urging the hooked branch toward the saw blade section of the saw body, the saw blade section of the saw body is advanced and retreated, so that the branch can be cut.

According to the branch cutting saw recited in claim 1, the hook section of the sheath body is pivotally supported at the leading end of the sheath body and is spring-biased such that the steady-state position of the hook section is in the longitudinal region of the sheath body. Therefore, in the steady state with no load or the like being applied, the hook section remains within the longitudinal region of the sheath body and does not largely protrude from the sheath body to the side. Thus, even in a place with dense branches, the hook section can be smoothly hooked onto the target branch without being caught by other branches.

Further, according to the branch cutting saw recited in claim 1, the hook section of the sheath body is rotated from the steady-state position when a load equivalent to or greater than the spring bias applied to the hook section is applied against the spring bias. This allows the hook section to flexibly accept a branch when hooked onto the branch.

Moreover, according to the branch cutting saw recited in claim 1, the saw blade section of the saw body is spring-biased so as to have the steady-state position at a position where the tip end of the saw blade section is retreated from the hook section. The saw blade section is also configured to be advanced from the steady-state position of the saw blade section when the grip section of the saw body is manipulated against the spring bias. Therefore, at the time when the hook section attached to the leading end of the sheath body is to be hooked onto a branch, the saw blade section is still in the position where its tip end is retreated from the hook section. This avoids the saw blade section from getting in the way when hooking the hook section onto the branch, and thus ensures a smooth hooking operation on the branch by the hook section.

According to the branch cutting saw recited in claim 2, in addition to the above-described functions and effects obtained by the configuration recited in claim 1, the hook section is configured such that when it is in its steady-state position, the position of the tooth tip line of the saw blade section is beyond the maximum branch acceptance line of the hook section in the branch cutting direction. Therefore, in the cutting operation, the branch on the hook section that is returning to the steady-state position, whether it is a thin or thick branch, can be reliably cut without leaving any uncut portion.

According to the branch cutting saw recited in claim 3, in addition to the above-described functions and effects obtained by the configuration recited in claim 1 or 2, the hook section is configured such that a gap is created between the hook section and the tooth tip line of the saw blade section of the saw body when the hook section is rotated backward in the retreating direction from the steady-state position thereof. Therefore, rotating the hook section with a branch caught therein in the retreating direction from its steady-state position can readily move the branch to a position further retreated from the tooth tip line of the saw blade. This allows the saw blade section to be readily advanced from its steady-state position to a side surface of the branch where the cutting is to be started, thereby enabling reliable cutting of the branch, whether thin or thick.

According to the branch cutting saw recited in claim 4, in addition to the above-described functions and effects obtained by the configuration recited in any of claims 1 to 3, the saw blade section has, following the row of teeth, the tip end region configured as a guide edge without a teeth row, and the guide edge is configured to slope and retreat from the position of the tooth tip line toward the tip end. Thus, the guide edge can readily guide the row of teeth of the saw blade section to the cutting start side surface of the branch. In other words, with the presence of the guide edge, even a thick branch exceeding the tooth tip line can be cut, as the inclined guide edge can guide the teeth row of the saw blade section toward the cutting start side surface of the branch.

According to the branch cutting saw recited in claim 5, in addition to the above-described functions and effects obtained by the configuration recited in any of claims 1 to 4, the saw includes the forward rotation stop means configured to stop the forward rotation of the hook section in the spring-biased direction beyond the steady-state position of the hook section. In other words, the forward rotation stop means is configured to forcibly stop the hook section from advancing further in the spring-biased direction from its steady-state position. The presence of this forward rotation stop means enables a stronger spring-biasing force to act on the hook section and also allows the hook section, which has rotated forward to the steady-state position, to remain in that position against the spring-biasing force. Thus, in the operation of hooking the hook section onto a branch, the hooking operation on a desired branch can be performed with the hook section stably positioned in the steady-state position, by moving it in between branches in a slim manner. In addition, in the operation of cutting the branch hooked by the hook section, the sufficient spring-biasing force of the hook section can press the branch strongly against the saw blade section, ensuring a good cutting operation.

According to the branch cutting saw recited in claim 6, in addition to the above-described functions and effects obtained by the configuration recited in any of claims 1 to 5, the hook section is configured in a U shape with the back portion parallel to the advancing and retreating directions of the saw blade section as the bent portion, so the hook section can be increased in strength with the double-layered structure. Further, the gap formed by the U shape is configured as the advancing and retreating passage for the saw blade section, allowing the hook section and the saw blade section to be arranged in a mutually overlapping state, making the longitudinal region of the sheath body less bulky and slimmer. Furthermore, the branch acceptance recess is configured to open toward the belly portion opposing the back portion of the hook section, and the position of the tooth tip line of the saw blade section is configured to be at a position deeper than the bottom of the branch acceptance recess. This allows the branch to be accepted sufficiently to the bottom of the branch acceptance recess, ensuring reliable cutting by the saw blade section in a stable state.

According to the branch cutting saw recited in claim 7, in addition to the above-described functions and effects obtained by the configuration recited in any of claims 1 to 6, the saw body is configured such that the saw blade section is attached to the grip section via the rod section. This can keep the saw blade section to the length necessary for cutting branches. Further, by winding the biasing spring around the rod section between the sheath body and the grip section, the biasing spring can be placed reliably and stably, and by the thus-wound biasing spring, the saw blade section of the saw body can be placed in its steady-state position reliably and stably.

According to the branch cutting saw recited in claim 8, in addition to the above-described functions and effects obtained by the configuration recited in any of claims 1 to 7, the sheath body is configured as a cylindrical shape and the leading end of the sheath body is covered with the back metal for pivotally supporting the hook section. Covering the leading end of the sheath body with the back metal can increase the strength of the leading end of the sheath body, so the hook section subjected to a load can be tightly attached thereto.

According to the branch cutting saw recited in claim 9, in addition to the above-described functions and effects obtained by the configuration recited in any of claims 1 to 8, the teeth provided in the saw blade section are isosceles triangular in shape, so when cutting a branch, the cutting angle of the teeth against the branch is not too deep in either the advancing or retreating direction of the saw blade section, and even a thin branch that is difficult to fix can be cut smoothly, with the biting of the teeth being prevented.

DESCRIPTION OF EMBODIMENTS

Figure 1:
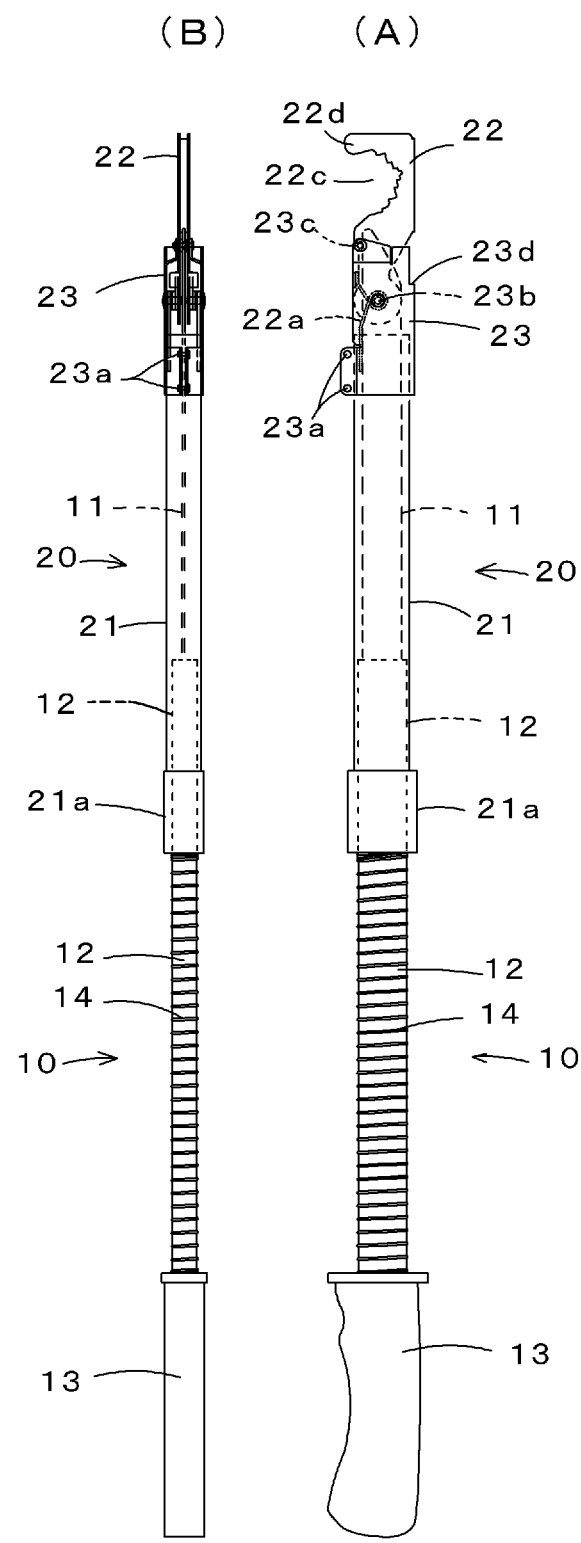
FIG. 1 is an overall view of a branch cutting saw according to an embodiment of the present invention in a state where both a hook section and a saw blade section are in a steady-state position, with (A) being a front view and (B) being a left side view.
Figure 2:
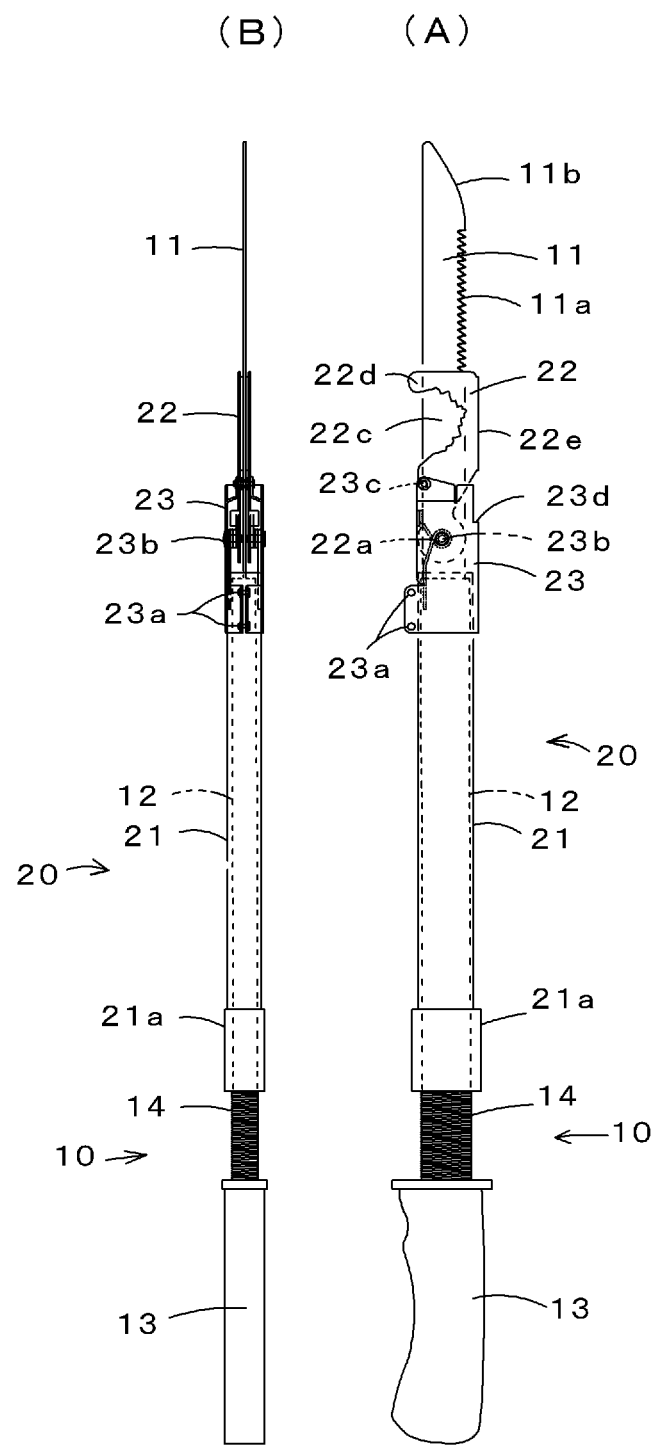
FIG. 2 is an overall view of the branch cutting saw according to the embodiment of the present invention in a state where the hook section is in its steady-state position and the saw blade section is in a maximum advanced position, with (A) being a front view and (B) being a left side view.
Figure 3:
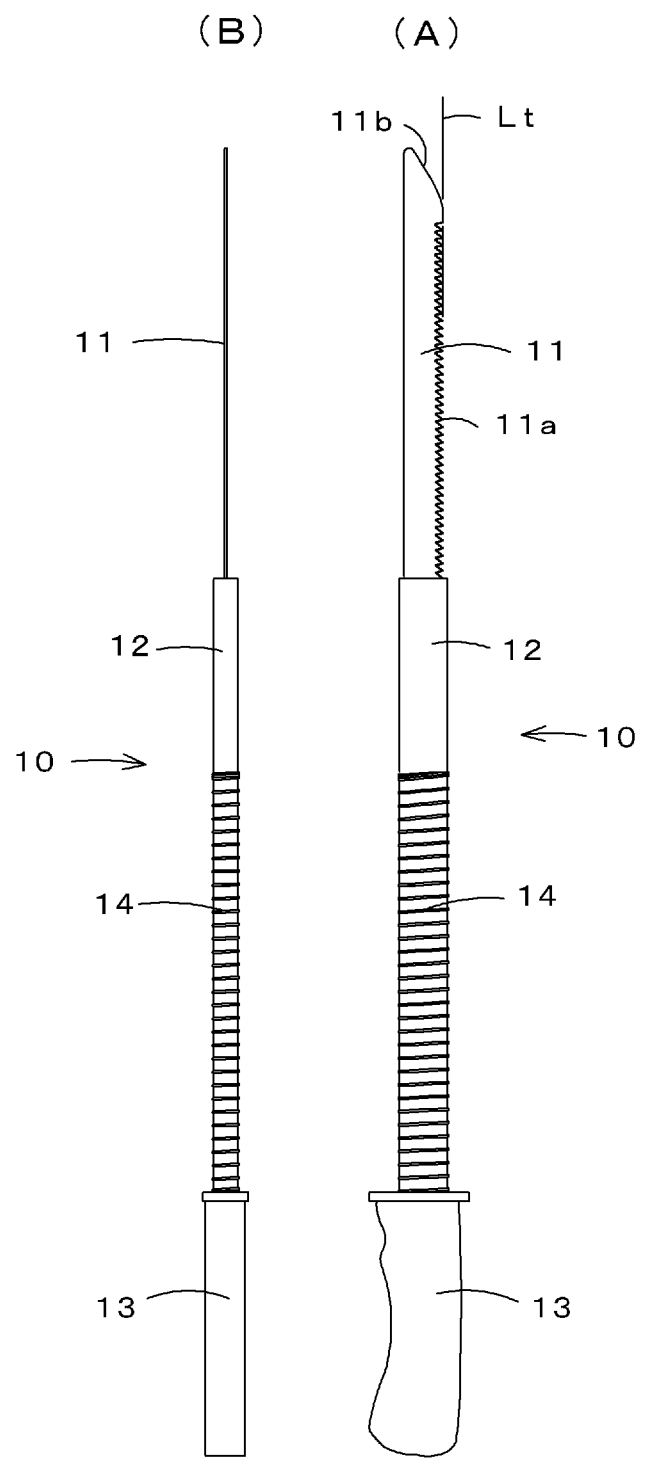
FIG. 3 shows a saw body of the branch cutting saw according to the embodiment of the present invention, with (A) being a front view and (B) being a left side view.
Figure 4:
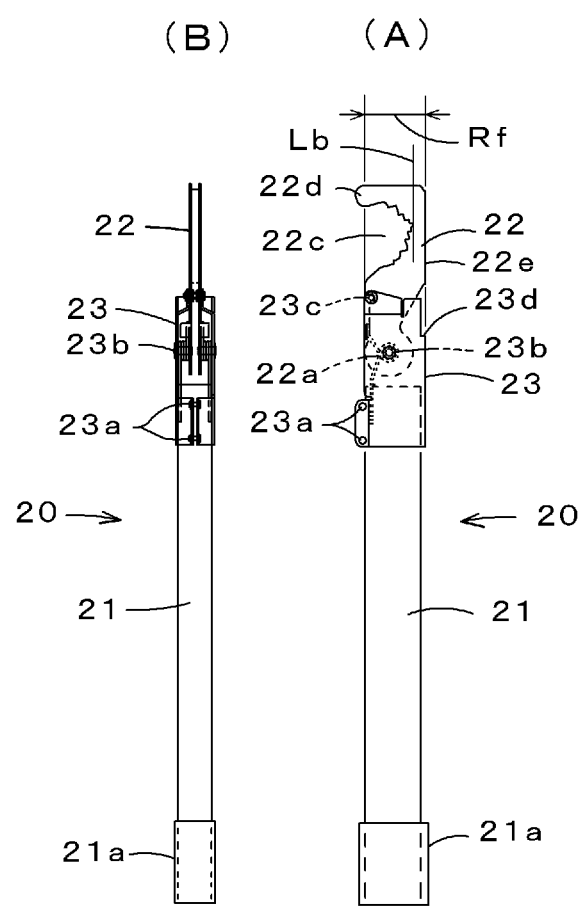
FIG. 4 shows a sheath body of the branch cutting saw according to the embodiment of the present invention, with (A) being a front view and (B) being a left side view.

A branch cutting saw according to an embodiment of the present invention will be described below with reference to the drawings.

Referring first to FIGS. 1 to 4, the branch cutting saw includes a saw body 10 and a sheath body 20.

The saw body 10 includes a saw blade section 11, a rod section 12, and a grip section 13. The rod section 12 has a biasing spring 14 mounted thereon.

The sheath body 20 includes a sheath section 21 that holds the saw body 10 in a freely retractable manner. The sheath section 21 has a hook section 22 on its leading end.

The saw blade section 11 of the saw body 10, which is a portion that actually cuts a branch T, is provided with teeth 11a as a row of teeth.

The rod section 12 of the saw body 10, which serves as a connection between the saw blade section 11 and the grip section 12, may be a solid rod or a hollow rod having an oval or other shape in cross section, and may be configured with lightweight and strong metal, plastic, or the like. In the present embodiment, in practice, the rod section 12 is composed of an oval-shaped aluminum pipe.

The saw blade section 11 is attached to a leading end of the rod section 12. The saw blade section 11 can advance forward or retreat from the sheath section 21. The leading end of the rod section 12 remains inside the sheath section 21, and the saw blade section 11 is attached to that end.

The grip section 13 of the saw body 10 is a portion that is gripped with a hand for manipulation of the saw body 10.

The grip section 13 is attached to a trailing end of the rod section 12 that penetrates backward from the sheath section 21.

The biasing spring 14 of the saw body 10 is composed of a compression coil spring, which is located between the sheath section 21 and the grip section 13 and mounted on the rod section 12. The biasing spring 14 causes the saw body 10 to retreat and attain a steady state in its most retreated position. In this state, the saw blade section 11 has its tip end positioned slightly retreated from a branch acceptance recess 22c of the hook section 22 to take a steady-state position, that is, a saw blade section steady-state position Ns.

Incidentally, it can be said that the teeth 11a in the saw blade section 11 of the saw body 10 are arranged on the back side of the saw blade section 11, unlike the usual arrangement, in relation to the grip shape of the grip section 13 of the saw body 10.

The saw body 10 is configured as a straight line as a whole.

The sheath section 21 of the sheath body 20 is cylindrical in shape and holds the saw blade section 11 and the rod section 12, inserted in the cylinder, in a freely retractable manner. The sheath section 21 can be configured with an aluminum or other lightweight metal cylinder with an oval or other cross-sectional shape. The sheath section 21 can of course be made of a plastic material as well. In the present embodiment, the sheath section 21 is actually configured with an aluminum pipe.

The sheath section 21 has a trailing end on which a retaining ring 21a is fitted and secured for retaining a front end of the biasing spring 14. That is, the biasing spring 14 is mounted in the state of being wound around the rod section 12 between the retaining ring 21a at the trailing end of the sheath section 21 and the grip section 13. The biasing spring 14, which is made of a compression coil spring, exerts a biasing force to push the saw body 10 steadily down to the most retreated position. This most retreated position of the saw body 10 is also the saw blade section steady-state position Ns of the saw blade section 11.

The operator grasps the sheath section 21 of the sheath body 20 with one hand and grasps the grip section 13 of the saw body 10 with the other hand, and first hooks the hook section 22 attached to the leading end of the sheath body 20 onto a desired branch T. Then, while urging the hooked branch T toward the saw blade section 11, the operator manipulates the grip section 13 to cut the branch T with the teeth 11a of the advanced saw blade section 11.

Figure 5:
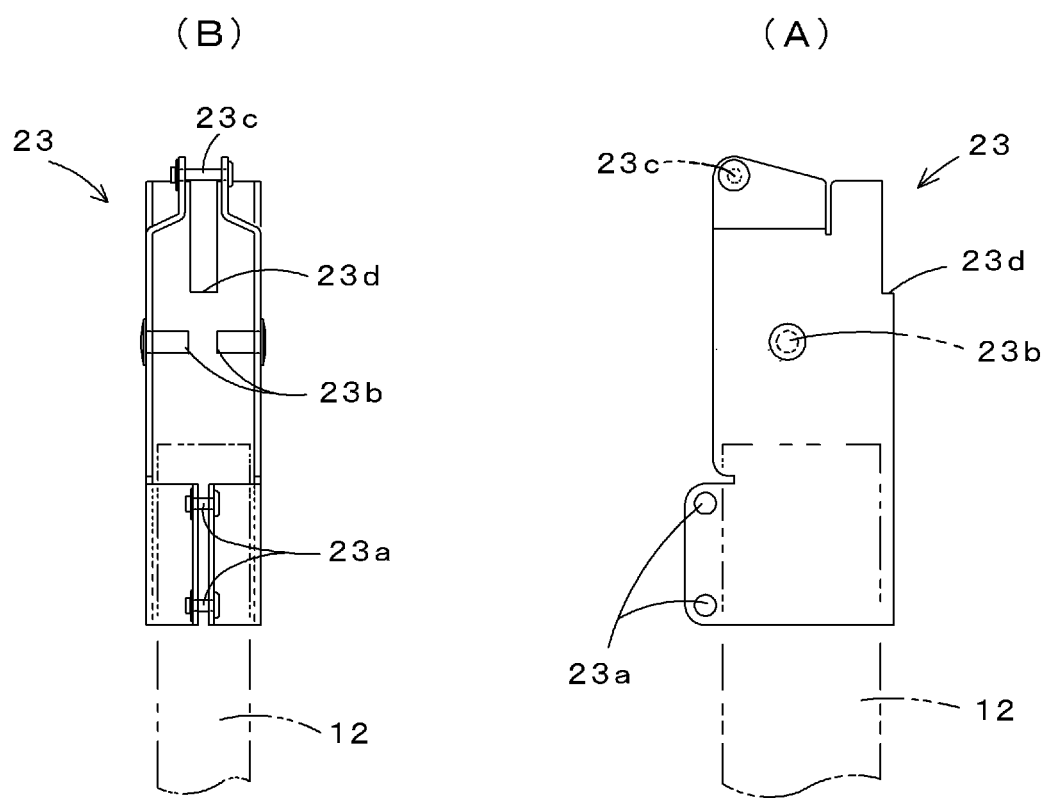
FIG. 5 is an enlarged view of a main part of the sheath body of the branch cutting saw according to the embodiment of the present invention, with (A) being a front view and (B) being a left side view.

Referring to FIG. 5, the hook section 22 is disposed at the leading end of the sheath section 21 via a back metal 23.

The back metal 23 is a member that is primarily for attaching the hook section 22 to the leading end of the sheath body 20.

The back metal 23 has its rear half mounted on and secured to the leading end of the sheath section 21. More specifically, the back metal 23 is made of a metallic plate bent into a U shape, and the U-shaped back metal 23 is fitted over the leading end of the sheath section 21. The U-shaped back metal 23 is secured with its pair of open edges fastened by screws 23a at a side of the sheath section 21.

The back metal 23 has its front half configured to protrude forward from the leading end of the sheath section 21.

The front half of the back metal 23 protruding from the sheath section 21 is provided with a pivot shaft 23b for pivotally supporting the hook section 22.

Also provided in the front half of the back metal 23 is a forward rotation stop pin 23c serving as a forward rotation stop means that stops the forward rotation of the hook section 22 beyond a hook section steady-state position Fs, which will be described later.

The front half of the back plate 23 is also provided with a backward rotation stop receiver 23d serving as a backward rotation stop means that stops the hook section 22 from rotating backward beyond a certain extent.

Figure 6:
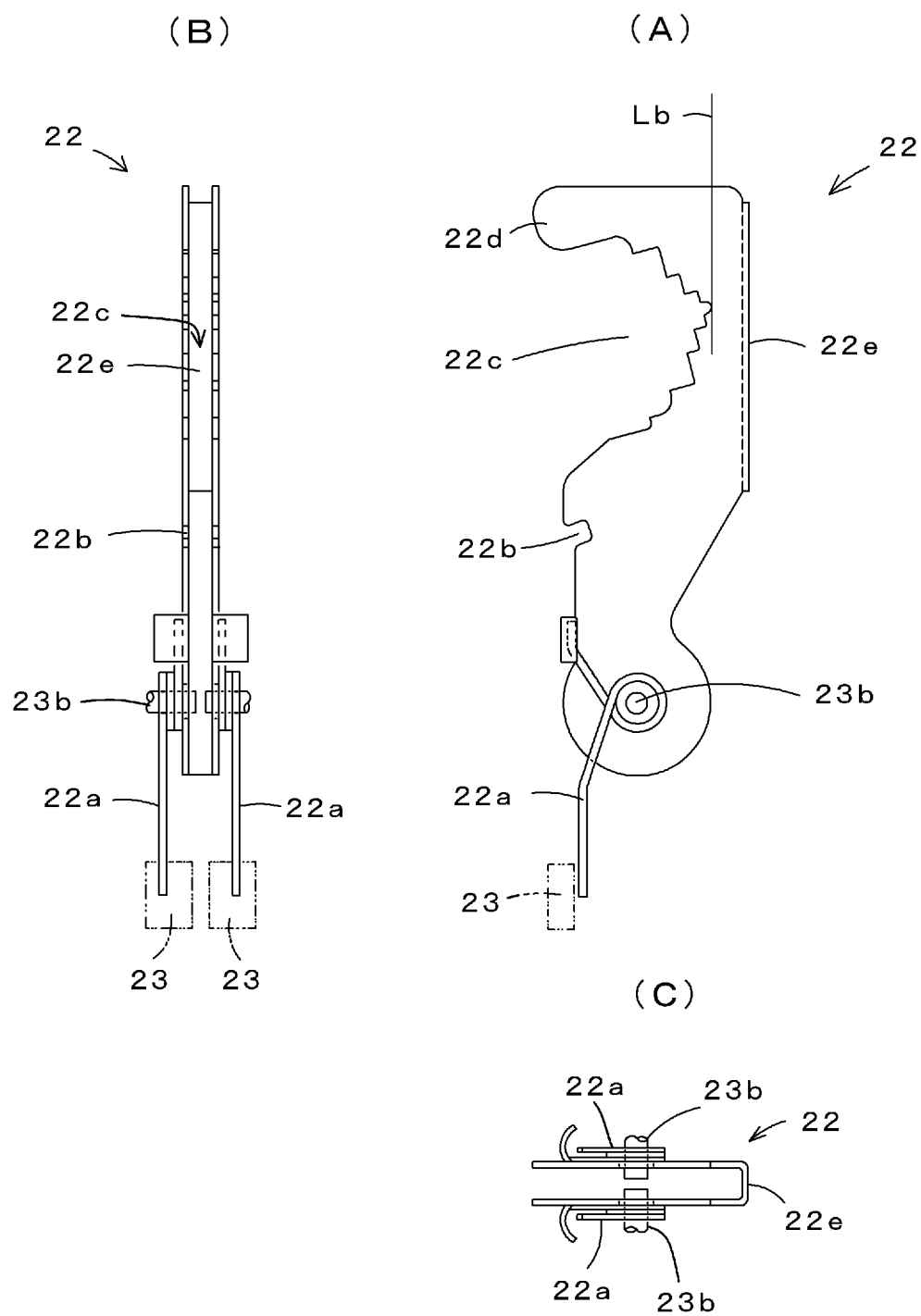
FIG. 6 shows the hook section of the sheath body of the branch cutting saw according to the embodiment of the present invention, with (A) being a front view, (B) being a left side view, and (C) being a bottom view.

Referring also to FIG. 6, the hook section 22 is attached to the leading end of the sheath body 20 in the state where it is pivotally supported by the pivot shaft 23b of the back metal 23 at its rear portion and its front portion protrudes forward from the leading end of the back metal 23.

The pivot shaft 23b has a biasing spring 22a attached thereto. The biasing spring 22a is a torsion coil spring, which is fitted wound around the pivot shaft 23b. The biasing spring 22a has one end attached to the hook section 22 and another end attached to the back plate 23. A pair of such biasing springs 22a are fitted respectively to portions 23b, 23b of the pivot shaft split in the center. The pivot shaft 23b is split in the center for passing the saw blade section 11 therebetween.

With the above configuration of the biasing spring 22a, the hook section 22 attains a state of being constantly urged to rotate in the advancing direction.

The hook section 22 is configured to be stopped from rotating further in the advancing direction by the forward rotation stop pin 23c provided at the back metal 23. Specifically, when the hook section 22 rotates in the advancing direction and an engagement recess 22b in the hook section 22 engages the forward rotation stop pin 23c in the back metal 23, then the forward rotation of the hook section 22 is stopped at that position. The forward rotation stop pin 23c and the engagement recess 22b constitute the forward rotation stop means for the hook section 22.

Figure 7:
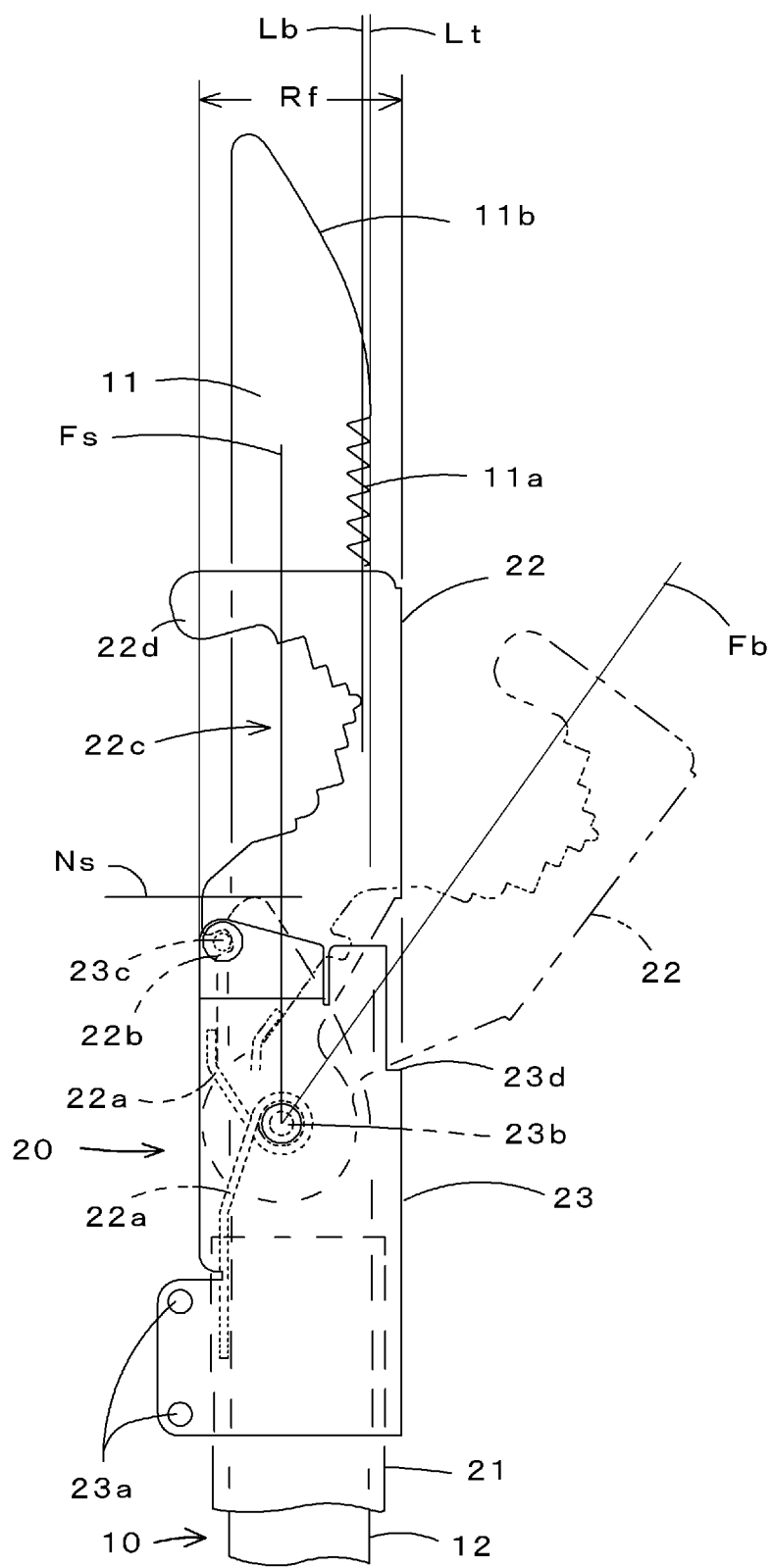
FIG. 7 is a front view of a main part of the branch cutting saw according to the embodiment of the present invention.

Referring to FIG. 7 as well, in the present embodiment, the hook section 22 is configured to take a steady-state position, i.e. the hook section steady-state position Fs, in the state where the forward rotation of the hook section 22 is stopped by the forward rotation stop pin 23c. The hook section steady-state position Fs is configured to be located in a longitudinal region Rf of the sheath body 20. That is, at the hook section steady-state position Fs, the hook section 22 takes a posture extending almost straight in the longitudinal region Rf of the sheath body 20. Therefore, at the hook section steady-state position Fs, the hook section 22 is held not to protrude laterally, at least not to protrude significantly, from the longitudinal region Rf of the sheath body 20. Therefore, even in places with dense branches T, the hook section 22 and the sheath body 20 can be manipulated to smoothly pass through between the branches T. Thus, the hook section 22 can be smoothly hooked onto the desired branch T, without getting caught on other branches T.

Even when the hook section 22 is in the hook section steady-state position Fs, the biasing spring 22a is spring-biasing the hook section 22 further in the advancing direction. However, such spring-biasing force is blocked by the forward rotation stop pin 23c. Thus, the hook section 22 is prevented from rotating further in the advancing direction from the hook section steady-state position Fs and remains stable in the hook section steady-state position Fs in the spring-biased state.

On the other hand, when the hook section 22 in the hook section steady-state position Fs suffers an external load exceeding the spring-biasing force applied in the retreating direction, the hook section 22 is rotated backward against the spring-biasing force of the biasing spring 22a. It is configured such that the retreat of the hook section 22 from the hook section steady-state position Fs creates a gap S between a tooth tip line Lt of the saw blade section 11 and the branch T.

A typical case when a load is applied to the hook section 22 in the retreating direction is when the hook section 22 hooks on a branch T and that branch pushes the hook section 22 to move backward.

The configuration of causing the hook section 22 to move backward from the hook section steady-state position Fs to create a gap S between the tooth tip line Lt and the branch T makes it possible to cut even thicker branches T.

When the hook section 22 moves backward from the hook section steady-state position Fs, the biasing force exerted by the biasing spring 22a in the direction of the hook section steady-state position Fs becomes stronger by the amount of the backward movement. With this, the branch T in the retreated hook section 22 is urged toward the saw blade section 11 by the stronger biasing force. This ensures easy and reliable cutting by the saw blade section 11.

It should be noted that the hook section 22 can make a backward rotation up to a hook section maximum retreated position Fb where the backward rotation is stopped by the backward rotation stop receiver 23d.

The hook section 22 is configured in a U shape with its back portion 22e parallel to the advancing and retreating directions of the saw blade section 11 as a bent portion. The gap created with this U shape is used as an advancing and retreating passage for the saw blade section 11.

The hook section 22 has a branch acceptance recess 22c that opens toward a belly portion opposing its back portion 22e.

Further, it is configured such that the tooth tip line Lt of the teeth 11a of the saw blade section 11 is positioned deeper than the bottom of the branch acceptance recess 22c. That is, more generally speaking, the tooth tip line Lt of the saw blade section 11 is configured to be located, in the branch cutting direction, at a position beyond a maximum branch acceptance line Lb of the hook section 22 that accepts the branch.

The branch acceptance recess 22c is configured in its shape as a recess with small irregularities, such that the recess can securely catch not only a thick branch T but also a thin branch T and hold it not to move this way and that.

The hook section 22 has, on its tip end on the belly side on which the branch acceptance recess 22c opens, a hooking head 22d that protrudes slightly laterally from the longitudinal region Rf to facilitate hooking on a branch T.

Configuring the hook section 22 in the U shape can improve the strength by virtue of the double-layered structure. Since the gap between the two pieces of the U shape is configured as the advancing and retreating passage for the saw blade section 11, the hook section 22 and the saw blade section 11 can be arranged in a mutually overlapping state. This makes the longitudinal region Rf of the sheath body 10 less bulky and slimmer. The tooth tip line Lt of the teeth 11a of the saw blade section 11 is located deeper than the bottom of the branch acceptance recess 22c. Therefore, even if the cutting operation is performed in the state where the branch T is fully received to the bottom of the branch acceptance recess 22c and stabilized, the branch T can be cut reliably to the end.

The saw blade section 11 has a tip end region, following the row of teeth 11a, configured as a guide edge 11b without a row of teeth. The guide edge 11b is configured to slope and retreat gradually from the position of the tooth tip line Lt toward the tip end. That is, the guide edge 11b without teeth 11a is gradually retreated toward the tip end, making it easier for the tip end of the guide edge 11b to reach the cutting start side surface of the branch T by that retreated amount. The guide edge 11b that has reached the cutting start side surface of the branch T then moves forward, during which the guide edge can move the branch T gradually backward and lead the branch to the row of teeth 11b. In other words, the presence of the guide edge 11b makes it easier to guide the saw blade section 11 to the cutting start side surface of the branch T, thereby enabling smooth cutting. Even in the case of a thicker branch T, the guide edge 11b is able to guide the row of teeth 11a of the saw blade section 11 smoothly toward the cutting start side surface of the branch T.

It should be noted that in order to be able to accommodate even thin branches T as a branch cutting saw, the teeth 11a of the saw blade section 11 can be of relatively small dimensions. The cutting angle of the teeth 11a with respect to the branch T may be relatively small in both the advancing direction and retreating direction of the saw blade section 11; for example, isosceles triangular teeth 11a can be used. By configuring the teeth 11a in this manner, when cutting a branch T, even a thin branch that is difficult to secure can be smoothly cut on the push stroke and/or the pull stroke, without the teeth getting caught in the branch.

The saw blade section 11 of the saw body 10 is spring-biased such that the steady-state position of the saw blade section 11, i.e. the saw blade section steady-state position Ns, is located at a position where the tip end of the saw blade section 11 is retreated from the hook section 22. In the present embodiment, more specifically, the saw blade section 11 is configured to have the saw blade section steady-state position Ns at the position where the tip end of the saw blade section 11 is retreated from the branch acceptance recess 22c of the hook section 22. With this configuration, when performing the operation of hooking the hook section 22 onto a branch T, the saw blade section 11 can be prevented from being exposed from the sheath body 20 and interfering with the operation.

The saw blade section steady-state position Ns is preferably set at a position where the tip end of the saw blade section 11 is only slightly retreated from the hook section 22 and hidden, as it allows the saw blade section 11 to be quickly advanced when performing the cutting operation.

It is the biasing spring 14 that spring-biases the saw blade section 11 to the saw blade section steady-state position Ns.

The biasing spring 14, as a compression coil spring as described above, urges the saw body 10 steadily down to the most retreated position. Here, the most retreated position of the saw body 10 is made to be the saw blade section steady-state position Ns for the saw blade section 11. In this saw blade section steady-state position Ns, the tip end of the saw blade section 11 is positioned slightly retreated from the branch acceptance recess 22c of the hook section 22.

Holding the grip section 13 of the saw body 10 and moving it forward from the most retreated position causes the tip end of the saw blade section 11 to be advanced forward from the saw blade section steady-state position Ns and exposed.

Figure 8:
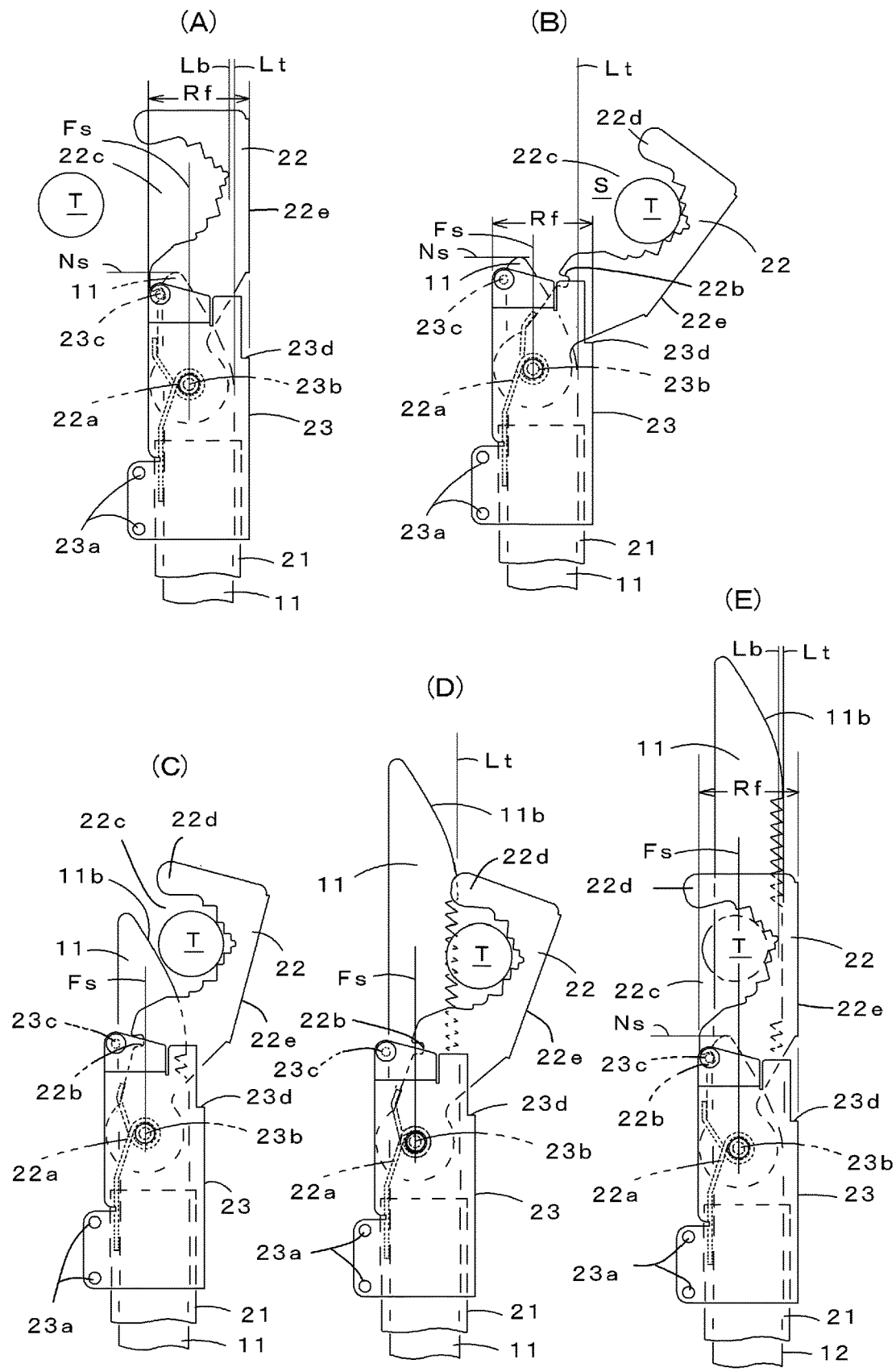
FIG. 8 illustrates a branch cutting action by the branch cutting saw according to the embodiment of the present invention, with (A), (B), (C), (D), and (E) showing different states in the middle of the cutting action.

Referring to FIG. 8 as well, the functional action of the branch cutting saw according to the embodiment of the present invention will be described. The operator holds the grip section 13 of the saw body 10 with one hand and the sheath section 21 of the sheath body 20 with the other hand, and begins the operation of hooking the hook section 22 onto a desired branch T (A). At this time, the hook section 22 is in the hook section steady-state position (Fs). The saw blade section 11 is in the saw blade section steady-state position (Ns), with its tip end being hidden, slightly retreated from the branch acceptance recess 22c of the hook section 22. This allows the hook section 22 to be manipulated smoothly in a slim state for hooking operations. During this time, the saw blade section 11 is in a retreated position and does not interfere with the hooking operation.

When the hook section 2 is hooked onto the branch T and pushed a little further, the repulsive force of the branch T causes the hook section 22 to rotate backward a little against the biasing force of the biasing spring 22 (B). This creates a gap S between the tooth tip line Lt of the saw blade section 11 and the branch T.

With the gap S thus created, when the operator manipulates the grip section 13 to advance the saw blade section 11, then the guide edge 11b on the tip end of the saw blade section 11 first abuts against the cutting start side surface of the branch T that has rotated forward from the retreated position while being spring-biased (C).

The guide edge 11b, while advancing, moves the branch T together with the hook portion 22 slightly backward, and guides the teeth 11a of the saw blade section to reach the cutting start side surface of the branch T (D).

The row of teeth 11a that has reached the cutting start side surface of the branch T cuts the branch T with a single advancing action or two or more advancing and retreating actions (E).

As the cutting of the branch T proceeds, the position of the hook section 22 progressively returns by spring to the hook section steady-state position Fs, and when the hook section 22 finally returns to the hook section steady-state position Fs, the position of the tooth tip line Lt of the saw blade section 11 crosses the bottom of the branch acceptance recess 22c, which is the maximum branch acceptance line Lb, in the cutting direction, and the cutting of the branch T is completed.

Thereafter, with the load applied by the manual operation being removed, the saw blade section 11 also returns automatically to the original saw blade section steady-state position Ns.

Figure 9:
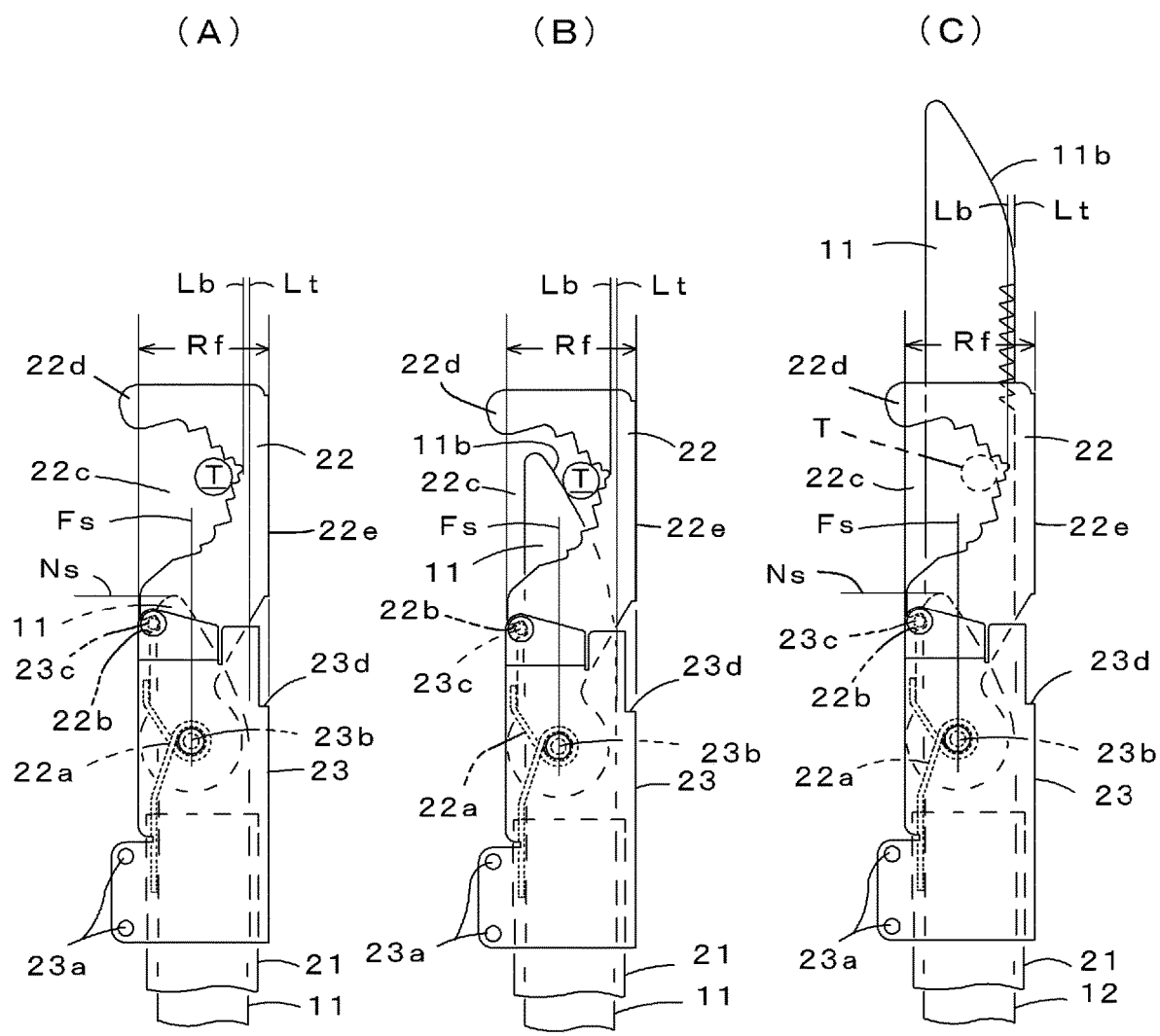
FIG. 9 illustrates an action of cutting a thin branch using the branch cutting saw according to the embodiment of the present invention, with (A), (B), and (C) showing different states in the middle of the cutting action.

The functional action when cutting a thin branch T will be described with reference to FIG. 9.

In this case, the repulsive force from a thin branch T when the hook section 22 is hooked onto the branch T is weak, so the hook section 22 hooked on the branch T hardly moves backward and remains in the hook section steady-state position Fs (A).

When the operator holding the grip section 13 advances the saw blade section 11 from the saw blade section steady-state position Ns, the guide edge 11b at the tip end of the saw blade section 11 first reaches the thin branch T in the hook section 22 and contacts the cutting start side surface (B). Then, the guide edge 11b guides the teeth 11a to the cutting start side surface of the thin branch T while moving the thin branch T together with the hook section 22 backward along the slope of the guide edge 11b. In this state, the hook section 22 is in a position slightly retreated from the hook section steady-state position Fs and the biasing force by the biasing spring 22a is working on the hook section 22, making the thin branch T pressed against the saw blade section 11. This ensures a smooth cutting operation by the saw blade section 11. In the case of a thin branch T, the first advance of the saw blade section 11 can cut the branch with the push stroke.

At the end of the cutting, the hook section 22 returns to the hook section steady-state position Fs, and the cutting is completed once the tooth tip line Lt of the saw blade section 11 has crossed the bottom of the branch acceptance recess 22c, i.e. the maximum branch acceptance line Lb, in the cutting direction (C).

Thereafter, with the removal of the load applied by the manual operation, the saw blade section 11 also returns automatically to the original saw blade section steady-state position Ns.

Figure 10:
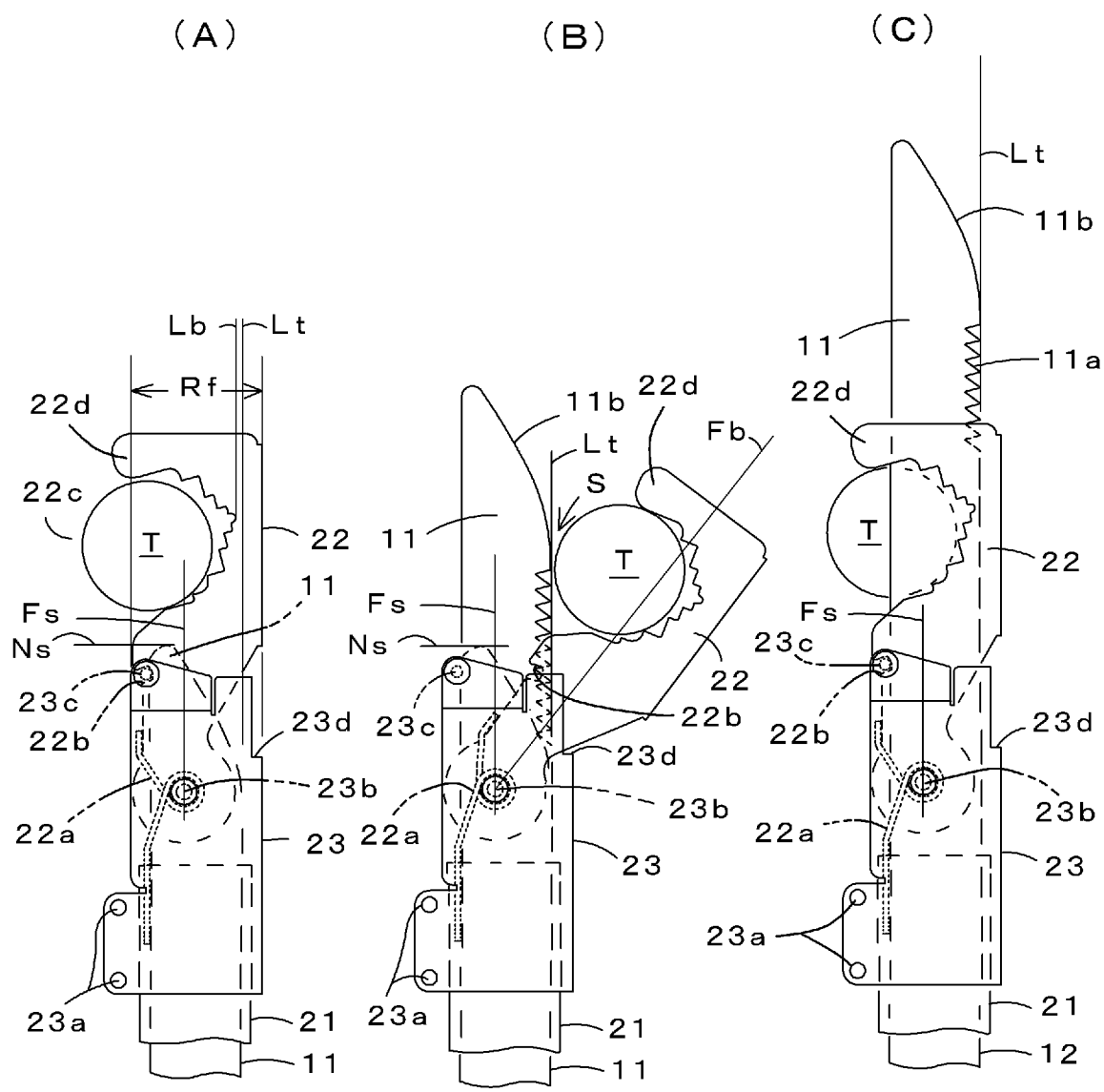
FIG. 10 illustrates an action of cutting a thick branch using the branch cutting saw according to the embodiment of the present invention, with (A), (B), and (C) showing different states in the middle of the cutting action.

The functional action when cutting a thick branch T will be described with reference to FIG. 10.

In this case, when the hook section 22 being in the hook section steady state Fs is hooked onto a thick branch T, the cutting start side surface of the thick branch T is at a position advanced further from the tooth tip line Lt and the guide edge 11b of the saw blade section 11, making it impossible in this state for the saw blade section 11 to advance to the cutting start side surface of the thick branch T (A).

Therefore, the hook section 22 is pressed against the thick branch T to let the sufficiently large repulsive force of the thick branch T rotate the hook section 22 sufficiently in the retreating direction. This enables the hook section 22 to be retreated to the hook section maximum retreated position Fb where the hook section 22 is stopped by the backward rotation stop receiver 23d in the back metal 23 (B). Thus, when the hook section 22 is in the hook section maximum retreated position Fb, if the position of the cutting start side surface of the thick branch T can be retreated beyond the tooth tip line Lt of the saw blade section 11, then the thick branch T can be cut.

When the hook section 22 hooked on the thick branch T is rotated backward enough to advance the saw blade section 11, the guide edge 11b of the saw blade section 11 first reaches the cutting start side surface of the thick branch T, and further, the row of teeth 11a reaches the surface, where the cutting is started. With the progress of the cutting by the saw blade section 11, the hook section 22 is urged to rotate toward the hook section steady-state position Fs, while continuously pushing the thick branch T onto the saw blade section 11.

At the time point when the hook section 22 returns to the hook section steady-state position Fs, the cutting is complete (C).

Thereafter, the saw blade section 11 also returns automatically to the original saw blade section steady-state position Ns with the removal of the load applied by the manual operation.

It should be noted that in the above embodiment, the biasing force by the biasing spring 22a on the hook section 22 is configured to be applied in the direction of forward rotation of the hook section 22 even in the hook section steady-state position Fs. The stop of the hook section 22 at the hook section steady-state position Fs is made by the forward rotation stop pin 23c. However, the spring biasing on the hook section 22 is not limited to this configuration.

A biasing spring may be provided which makes the spring biasing force neutral when the hook section 22 is in the hook section steady-state position Fs and which spring-biases the hook section 22 to return to the hook section steady-state position Fs when the hook section 22 is displaced from the hook section steady-state position Fs either in the advancing direction or the retreating direction. Such a configuration is also within the scope of the present invention. In this configuration, although the hook section 22 can rotate in either the advancing or retreating direction from the hook section steady-state position Fs, the hook section 22 itself remains stable in the hook section steady-state position Fs. This achieves the functional effects that the hook section 22 is slimly positioned at the hook section steady-state position Fs and can be smoothly hooked onto a branch.

Figure 11:
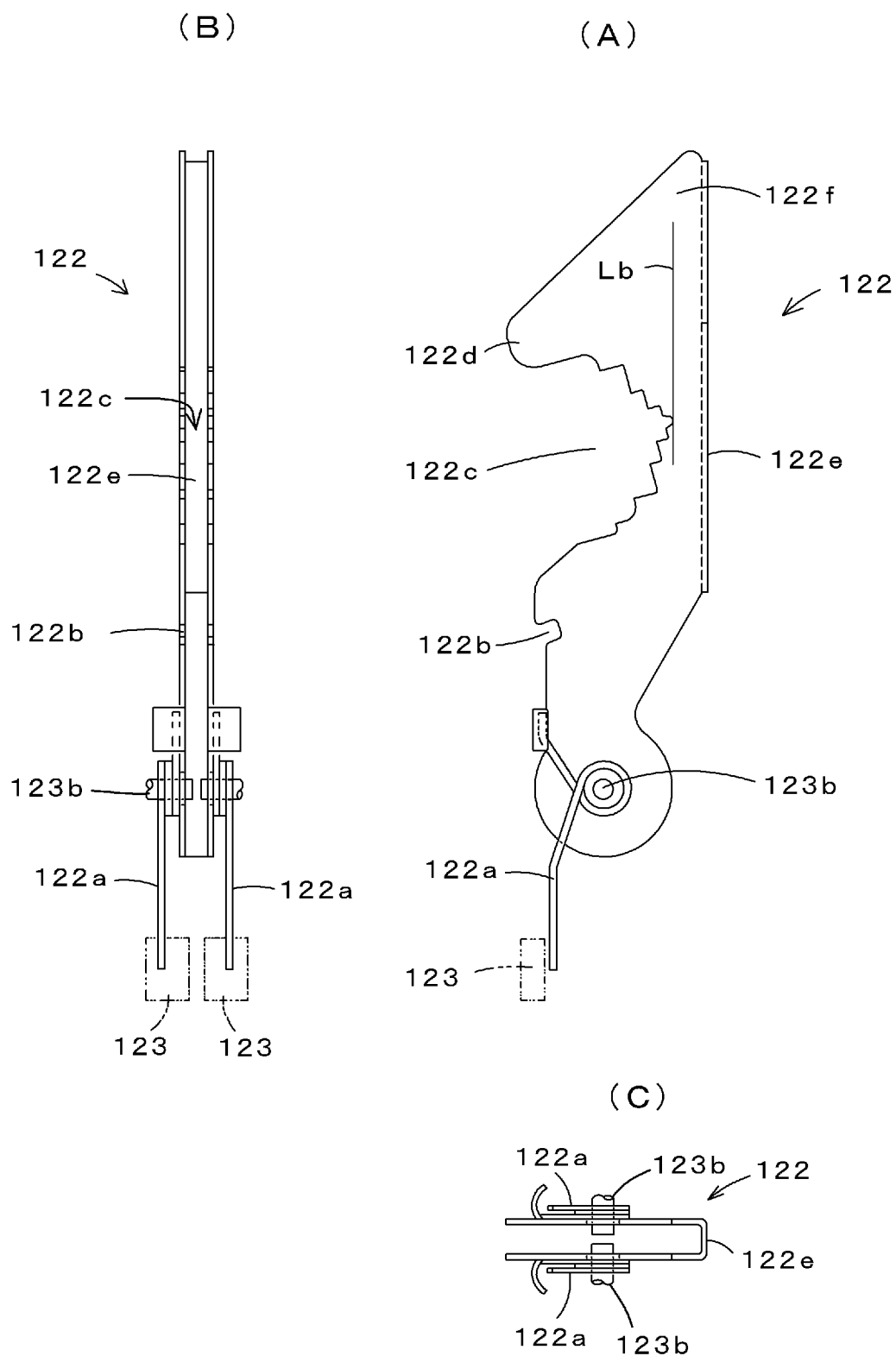
FIG. 11 shows another example of the hook section of the sheath body in the branch cutting saw according to the embodiment of the present invention, with (A) being a front view, (B) being a left side view, and (C) being a bottom view.

FIG. 11 shows a hook section 122, which is a variation of the above-described hook section 22. This hook section 122 has a head portion 122f configured to taper toward the tip. The tapering head portion 122f allows the hook section 122 to penetrate in between the branches more easily. The biasing spring 122a, engagement recess 122b, branch acceptance recess 122c, hooking head 122d, and back portion 122e correspond to the previously described biasing spring 22a, engagement recess 22b, branch acceptance recess 22c, hooking head 22d, and back portion 22e, respectively.

INDUSTRIAL APPLICABILITY

The branch cutting saw of the present invention has industrial applicability as a saw for, for example, pruning tree branches in orchards or other places.

REFERENCE SIGNS LIST

10: saw body
11: saw blade section
11a: tooth
11b: guide edge
12: rod section
13: grip section
14: biasing spring
20: sheath body
21: sheath section
21a: retaining ring
22, 122: hook section
22a, 122a: biasing spring
22b, 122b: engagement recess
22c, 122c: branch acceptance recess
22d, 122d: hooking head
22e, 122e: back portion
122f: head portion
23: back metal
23a: screw
23b: pivot shaft
23c: forward rotation stop pin
23d: backward rotation stop receiver
Fs: hook section steady-state position
Ff hook section maximum retreated position
Rf: longitudinal region
Lt: tooth tip line
Lb: maximum branch acceptance line
Ns: saw blade section steady-state position
S: gap
T: branch

The invention claimed is:

1. A branch cutting saw comprising a saw body including at least a saw blade section and a grip section, and a sheath body operative to hold the saw body in a freely retractable manner and including a hook section for hooking onto a branch, the saw being configured such that the sheath body is manipulated to hook the hook section onto a branch and, while urging the hooked branch toward the saw blade section of the saw body, the saw blade section of the saw body is advanced and retreated to cut the branch, wherein
the hook section of the sheath body is pivotally supported at a leading end of the sheath body and is under spring bias to have a steady-state position in a longitudinal region of the sheath body, and is configured to be rotationally displaced from the steady-state position of the hook section when a load equivalent to or greater than the spring bias is applied against the spring bias, and
the saw blade section of the saw body is under spring bias to have a steady-state position at a position where a tip end of the saw blade section is retreated from the hook section, and is configured to be advanced from the steady-state position of the saw blade section when the grip section of the saw body is manipulated against the spring bias.

2. The branch cutting saw according to claim 1, wherein the hook section is configured such that a position of a tooth tip line of the saw blade section of the saw body is, in a branch cutting direction, at a position beyond a maximum branch acceptance line of the hook section in the steady-state position.

3. The branch cutting saw according to claim 2, wherein the hook section is configured such that a gap is created between the hook section and a tooth tip line of the saw blade section of the saw body as the hook section is rotated backward in a retreating direction from the steady-state position of the hook section.

4. The branch cutting saw according to claim 2, wherein the saw blade section has, following a row of teeth, a tip end region configured as a guide edge without a teeth row, and the guide edge is configured to slope and retreat from a position of a tooth tip line toward the tip end.

5. The branch cutting saw according to claim 2, comprising a forward rotation stop means configured to stop a forward rotation of the hook section in a spring-biased direction beyond the steady-state position of the hook section.

6. The branch cutting saw according to claim 2, wherein the hook section is configured in a U shape with a back portion parallel to advancing and retreating directions of the saw blade section as a bent portion and has a branch acceptance recess that opens toward a belly portion opposing the back portion, a gap formed by the U shape is configured as an advancing and retreating passage for the saw blade section, and a position of a tooth tip line of the saw blade section opposing the back portion is configured to be at a position deeper than a bottom of the branch acceptance recess.

7. The branch cutting saw according to claim 2, wherein the saw body is configured such that the saw blade section is attached to the grip section via a rod section, and a biasing spring is arranged wound around the rod section between the sheath body and the grip section to cause the saw blade section to be spring-biased to the steady-state position of the saw blade section.

8. The branch cutting saw according to claim 2, wherein the sheath body is configured as a cylindrical shape and has a leading end thereof covered with a back metal for pivotally supporting the hook section.

9. The branch cutting saw according to claim 2, wherein the teeth provided in the saw blade section are isosceles triangular in shape.

10. The branch cutting saw according to claim 1, wherein the hook section is configured such that a gap is created between the hook section and a tooth tip line of the saw blade section of the saw body as the hook section is rotated backward in a retreating direction from the steady-state position of the hook section.

11. The branch cutting saw according to claim 1, wherein the saw blade section has, following a row of teeth, a tip end region configured as a guide edge without a teeth row, and the guide edge is configured to slope and retreat from a position of a tooth tip line toward the tip end.

12. The branch cutting saw according to claim 1, comprising a forward rotation stop means configured to stop a forward rotation of the hook section in a spring-biased direction beyond the steady-state position of the hook section.

13. The branch cutting saw according to claim 1, wherein the hook section is configured in a U shape with a back portion parallel to advancing and retreating directions of the saw blade section as a bent portion and has a branch acceptance recess that opens toward a belly portion opposing the back portion, a gap formed by the U shape is configured as an advancing and retreating passage for the saw blade section, and a position of a tooth tip line of the saw blade section opposing the back portion is configured to be at a position deeper than a bottom of the branch acceptance recess.

14. The branch cutting saw according to claim 1, wherein the saw body is configured such that the saw blade section is attached to the grip section via a rod section, and a biasing spring is arranged wound around the rod section between the sheath body and the grip section to cause the saw blade section to be spring-biased to the steady-state position of the saw blade section.

15. The branch cutting saw according to claim 1, wherein the sheath body is configured as a cylindrical shape and has a leading end thereof covered with a back metal for pivotally supporting the hook section.

16. The branch cutting saw according to claim 1, wherein the teeth provided in the saw blade section are isosceles triangular in shape.

* * * * *